UNITED STATES PATENT OFFICE 2,139,121

ALIPHATIC NITROALCOHOLS

Henry B. Hass, West Lafayette, and Byron M. Vanderbilt, Terre Haute, Ind., assignors to Purdue Research Foundation, La Fayette, Ind., a corporation of Indiana No Drawing. Application June 25, 1937, Serial No. 150,312

4 Claims. (Cl. 260—632)

Our invention relates to new and useful aliphatic nitroalcohols, and, more particularly, to the nitroalcohols having the following structural formula:

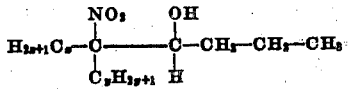

wherein $x$ is an integer, $y$ is zero or an integer, and $x$ plus $y$ is less than four.

Specific examples of the nitroalcohols included within the scope of our invention are:

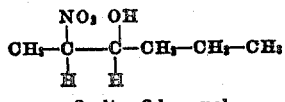

2-nitro-3-hexanol

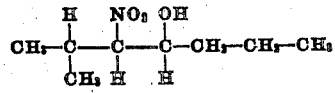

3-nitro-2-methyl-4-heptanol

These nitroalcohols may suitably be prepared by previously known methods for introducing the nitro group into an aliphatic compound, as, for example, by reacting silver nitrite with a corresponding halogen substituted alcohol however, we prefer to prepare these compounds in accordance with the process of copending application Serial No. 146,855, of Byron M. Vanderbilt, filed June 7, 1937. According to this process a primary or secondary nitroparaffin and an aliphatic aldehyde are reacted in the presence of an auxiliary solvent, such as ethyl alcohol, and in the presence of an alkaline catalyst such as sodium hydroxide, the aldehyde being slowly added to a solution of the nitroparaffin and catalyst in the auxiliary solvent while thoroughly agitating.

The nitroalcohols prepared by the above procedures may be purified according to any of the known means, as, for example, by treating with sodium bisulfite to remove aldehydes or aldehyde condensation products. We prefer, however, to purify these nitroalcohols by aerating the impure compounds for one to three hours at elevated temperatures, e. g. 70 to 100° C. The nitroalcohol is subsequently distilled from the resulting polymerized products. The resulting nitroalcohol may exist as a mixture of its stereoisomers. These may be separated further by fractional distillation, fractional crystallization, or other suitable means depending on the particular compound and the nature of stereoisomerism involved. The stereoisomers of 2-nitro-2-methyl-3-hexanol cannot be separated by physical method since only one asymmetric carbon atom is present in the molecule.

The following examples illustrate suitable procedures for the preparation of the nitroalcohols of this group:

Example I

A solution of 100 parts by weight of nitroethane, 60.7 parts of 95% ethyl alcohol, and 4.1 parts of 10 N sodium hydroxide was prepared, and to this solution was slowly added with thorough agitation 89 parts of normal butyraldehyde. The temperature was maintained at 30° C. during this addition. After addition of the aldehyde 6 parts of water were added in order to alloy the mixture to come into one phase or, if preferred, the water may be added to the initial mixture before the addition of the aldehyde. The resulting mixture was allowed to stand for five days at 30 to 35° C. without further agitation. At the conclusion of this period the sodium hydroxide was neutralized with an exact equivalent of hydrochloric acid, and the mixture was distilled under reduced pressure. The distillate was somewhat yellow in color, and was therefore subjected to aeration at 90° C. for two hours. The material was then redistilled under vacuum giving a clear white distillate consisting of 2-nitro-3-hexanol.

Example II

A solution of 154.5 parts by weight of 2-methyl-1-nitropropane, 121.3 parts of 95% ethyl alcohol, and 5.1 parts of 10.4 N sodium hydroxide was prepared, and to this solution were slowly added with thorough agitation 113.5 parts of normal-butyraldehyde. The temperature was maintained at approximately 30° C. during this addition, and the mixture was allowed to stand at this temperature for 3½ days without further agitation. At the conclusion of this period the sodium hydroxide was neutralized with an exact equivalent of hydrochloric acid and the mixture was distilled under reduced pressure. The distillate was somewhat yellow in color, and was therefore subjected to aeration at 90° C. for two hours. The material was then redistilled under vacuum giving a clear water white distillate consisting of 3-nitro-2-methyl-4-heptanol.

The nitroalcohols of this group are somewhat viscous colorless liquids having a pleasant, somewhat ester-like odor and are mixtures of their stereoisomers. This latter fact accounts for the wide range in boiling points and melting points of certain of these nitroalcohols. Thus, 3-nitro-2-methyl-4-heptanol has been separated into two isomeric forms by fractional distillation, one of which has a melting point of 53° C. and the other is liquid at room temperature. These compounds are all stable up to temperatures of 100° C. At a temperature of 150° C., however, they undergo more or less rapid decomposition depending on the particular alcohol. These compounds are only slightly soluble in water, i. e., less than 2% by volume. Water is soluble in these nitroalcohols, however, to an extent of 1 to 5% by volume.

The following physical properties were determined for the nitroalcohols of this group which were prepared in the manner indicated in the above examples:

|  | Boiling point at 10 mm. | Specific gravity $D^{25}_4$ | Refractive index at 20° C. |
|---|---|---|---|
|  | ° C. |  |  |
| 2-nitro-3-hexanol | 108–111 | 1.0575 | 1.4480 |
| 3-nitro-4-heptanol | 115–116 | 1.0275 | 1.4460 |
| 2-nitro-2-methyl-3-hexanol | 109 | 1.0405 | 1.4499 |
| 5-nitro-4-octanol | 123–124 | 1.0394 | 1.4463 |
| 3-nitro-3-methyl-4-heptanol | 118–119 | 1.0281 | 1.4532 |
| 3-nitro-2-methyl-4-heptanol | 121 |  |  |
| 3-nitro-2-methyl-4-heptanol (isomer) | 111 | 1.0140 | 1.4485 |

It is to be understood that the above data were obtained from single preparations of each of the above compounds and, while such data will be useful in identifying these compounds, we do not wish to limit ourselves to products having the exact constants listed. It is to be noted that, in general, mixtures of the stereoisomers are formed in my procedure and different percentages of isomers in the mixture in certain cases will give rise to slightly different physical properties of the compound.

The nitroalcohols of the present invention are useful organic solvents and constitute satisfactory solvents for nitrocellulose. These materials can be utilized in any nitrocellulose composition requiring a high boiling solvent. These nitroalcohols are, likewise, useful as intermediates for the preparation of numerous organic compounds, and various other uses of these materials will be apparent to those skilled in the art.

Our invention now having been described, what we claim is:

1. A nitroalcohol of the formula:

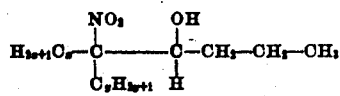

wherein $x$ is an integer, $y$ is a numeral selected from the class consisting of zero and integers, and $x$ plus $y$ is less than four.

2. 2-nitro-3-hexanol.
3. 3-nitro-4-heptanol.
4. 2-nitro-2-methyl-3-hexanol.

HENRY B. HASS.
BYRON M. VANDERBILT.